(12) United States Patent
Wavering

(10) Patent No.: US 10,541,519 B1
(45) Date of Patent: Jan. 21, 2020

(54) LARGE CURRENT CIRCUIT BREAKER PLUG-IN INSTALLATION

(71) Applicant: HAMILTON SUNDSTRAND CORPORATION, Charlotte, NC (US)

(72) Inventor: Jeffrey T. Wavering, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/156,438

(22) Filed: Oct. 10, 2018

(51) Int. Cl.
*H02B 1/044* (2006.01)
*H01R 13/64* (2006.01)
*H02B 1/056* (2006.01)
*H01R 43/26* (2006.01)
*H01R 13/631* (2006.01)

(52) U.S. Cl.
CPC ......... *H02B 1/044* (2013.01); *H01R 13/6315* (2013.01); *H01R 13/64* (2013.01); *H01R 43/26* (2013.01); *H02B 1/0565* (2013.01)

(58) Field of Classification Search
None
See application file for complete search history.

(56) References Cited

U.S. PATENT DOCUMENTS

| | | | | |
|---|---|---|---|---|
| 3,710,044 A * | 1/1973 | Sharp | ................... | H02B 11/127 200/50.25 |
| 3,772,489 A * | 11/1973 | Wilson | ................. | H01H 33/666 200/50.23 |
| 3,783,209 A * | 1/1974 | Cleaveland | .......... | H02B 11/133 200/50.25 |
| 6,040,747 A * | 3/2000 | Krasser | ................ | H01H 73/045 335/35 |
| 6,490,149 B2 * | 12/2002 | Shichida | .............. | H02B 11/127 200/50.21 |
| 6,689,968 B2 * | 2/2004 | Trivette | ............... | H01H 33/666 200/50.21 |
| 7,019,229 B1 * | 3/2006 | Weister | ..................... | H01H 9/22 200/50.01 |
| 7,965,493 B2 * | 6/2011 | Leeman | .................. | H02B 1/36 361/608 |
| 8,054,606 B2 * | 11/2011 | Morris | ..................... | H01H 3/26 361/115 |
| 8,183,480 B2 * | 5/2012 | Kim | ..................... | H02B 11/127 200/50.21 |
| 8,222,552 B2 * | 7/2012 | Kim | ....................... | H02B 11/10 200/308 |
| 8,471,159 B2 * | 6/2013 | Han | ..................... | H02B 11/133 200/50.25 |
| 8,817,454 B2 * | 8/2014 | Morris | .................... | F02D 11/02 361/614 |
| 9,425,590 B2 * | 8/2016 | Jo | ............................ | H01H 9/20 |
| 9,843,173 B2 * | 12/2017 | Farina | .................... | H01H 3/161 |
| 9,912,128 B2 * | 3/2018 | Mecca | ................. | H01H 71/025 |
| 2009/0000925 A1 * | 1/2009 | Webb | .................. | H02B 11/127 200/50.24 |

(Continued)

*Primary Examiner* — Xanthia C Cunningham
(74) *Attorney, Agent, or Firm* — Cantor Colburn LLP

(57) ABSTRACT

A method of assembling a circuit breaker installation includes inserting a carrier carrying a circuit breaker connected to a connector assembly having a connector pin into a first opening of a chassis and receiving a guide pin that extends from the carrier in a guide slot that is defined in a panel of a panel interface assembly plate that is disposed within a second opening of the chassis.

18 Claims, 4 Drawing Sheets

(56) References Cited

U.S. PATENT DOCUMENTS

| | | | |
|---|---|---|---|
| 2009/0255789 A1* | 10/2009 | Narayanan | H02B 11/127 200/50.21 |
| 2009/0257857 A1* | 10/2009 | Doddapadam Srinivasa Raghavachar | H02B 11/127 414/744.1 |
| 2010/0163374 A1* | 7/2010 | Kim | H01H 71/04 200/50.26 |
| 2010/0230257 A1* | 9/2010 | Kim | H01H 33/666 200/50.25 |
| 2010/0294630 A1* | 11/2010 | Park | H02B 11/127 200/50.25 |
| 2011/0147172 A1* | 6/2011 | Kim | H02B 11/133 200/50.21 |
| 2011/0214968 A1* | 9/2011 | Waynick, Sr. | H01H 9/00 200/50.24 |
| 2015/0179374 A1* | 6/2015 | Seo | H01H 33/48 218/140 |
| 2018/0096803 A1* | 4/2018 | Blochouse | H01H 9/22 |

* cited by examiner

LARGE CURRENT CIRCUIT BREAKER PLUG-IN INSTALLATION

BACKGROUND

The present disclosure relates to a large current circuit breaker plug-in installation.

Power distribution panels may be provided with circuit breakers that may require maintenance or replacement in a controlled and timely manner. Many circuit breakers are not easily replaced due to a lack of a modular or interchangeable circuit breaker design.

BRIEF DESCRIPTION

Disclosed is a circuit breaker installation that includes a chassis, a panel interface assembly plate, and a carrier. The chassis has a first panel defining a first opening and a second panel spaced apart from the first panel. The second panel defining a second opening. The panel interface assembly plate is connected to the second panel. The panel interface assembly plate has a panel plate defining a guide slot and a mating connector assembly extending through the panel plate. The carrier being arranged to receive a circuit breaker and a connector assembly connected to the circuit breaker. The carrier having a first carrier plate arranged to be connected to the circuit breaker, a second carrier plate extending from the first carrier plate, a bracket connected to the second carrier plate and spaced apart from the first carrier plate, and a guide pin extending from at least one of the second carrier plate and the bracket. The bracket is arranged to be connected to the connector assembly. The guide pin is arranged to be received within the guide slot. The guide pin may provide a keying feature for different rated circuit breakers by indexing or rotating to different angles to be received in the indexed or rotated guide slot.

Also disclosed is a carrier and panel interface assembly plate for a circuit breaker installation. The carrier includes a first carrier plate, a second carrier plate, a bracket, and a guide pin. The first carrier plate is connected to a circuit breaker. The second carrier plate extends from the first carrier plate. The bracket is connected to the second carrier plate and is spaced apart from the first carrier plate. The bracket is connected to a connector assembly that is connected to the circuit breaker. The connector assembly is disposed on panel interface assembly plate that floats in three axes to compensate and/or account for tolerance build up between a first panel and a second panel of a chassis. The guide pin extends from at least one of the second carrier plate and the bracket.

Further disclosed is a method of assembling a circuit breaker installation. The method includes inserting a carrier carrying a circuit breaker connected to a connector assembly having a connector pin, into a first opening of a chassis and receiving a guide pin that extends from the carrier in a guide slot that is defined in a panel of a panel interface assembly plate that is disposed within a second opening of the chassis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
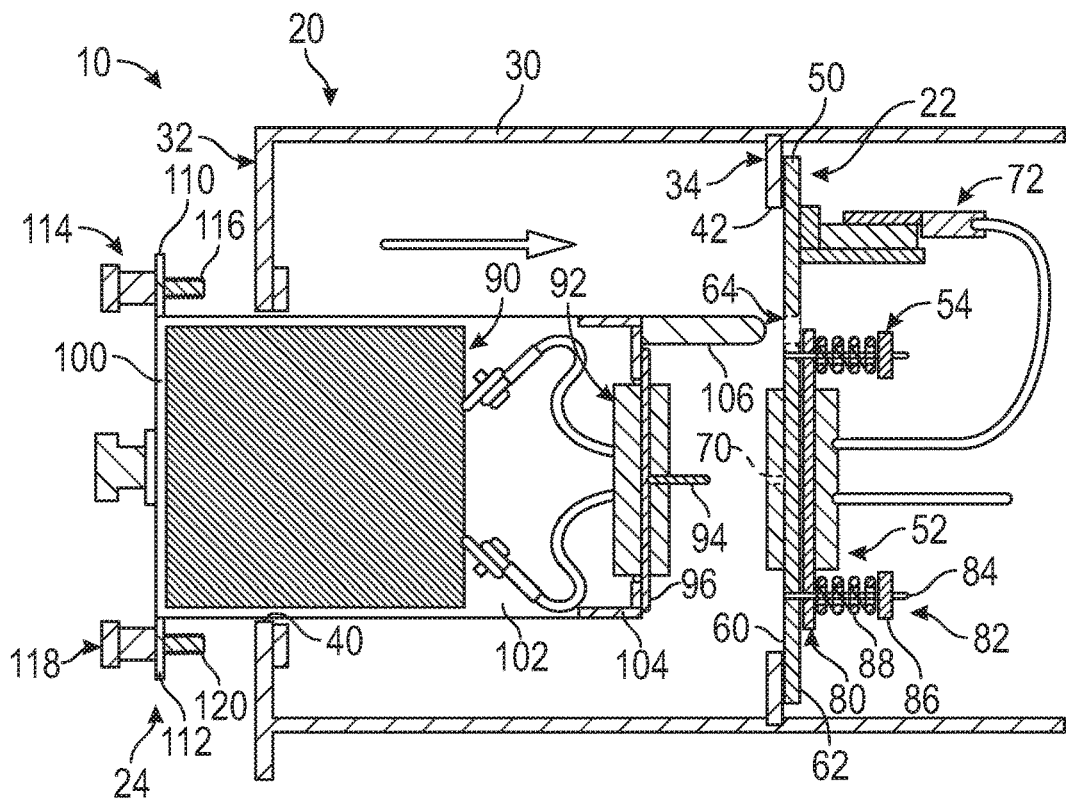
FIG. 1 is a partial view of a large current circuit breaker installation having a circuit breaker in a preinstalled position.
Figure 2:
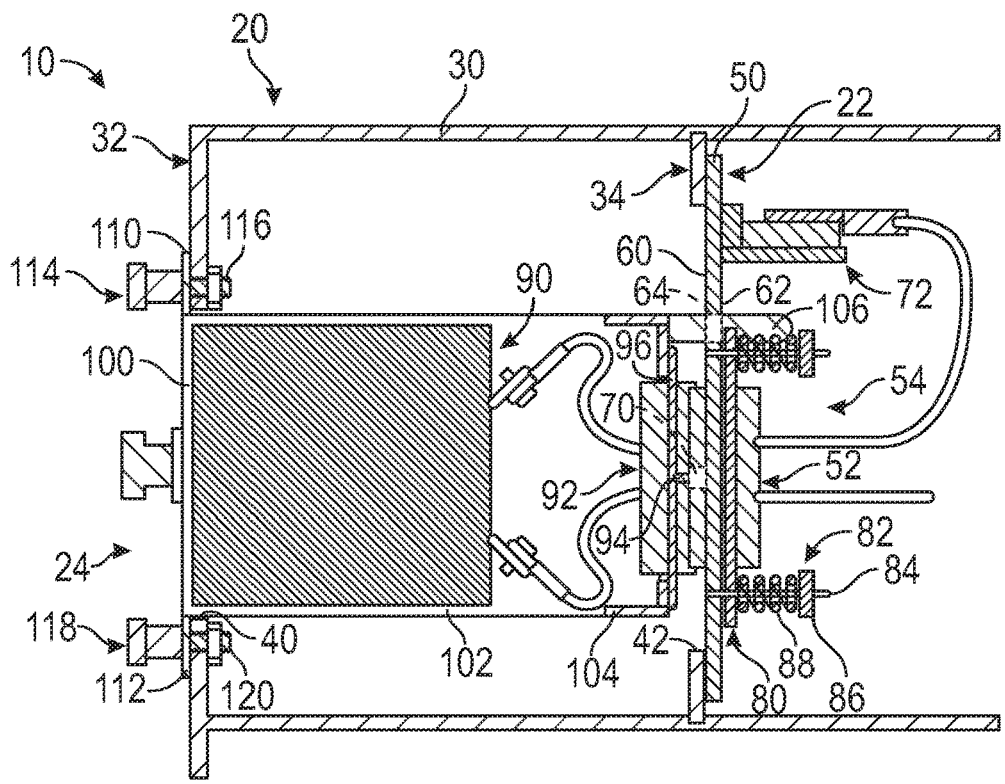
FIG. 2 is a partial view of the large current circuit breaker installation having the circuit breaker in an installed position.
Figure 3:
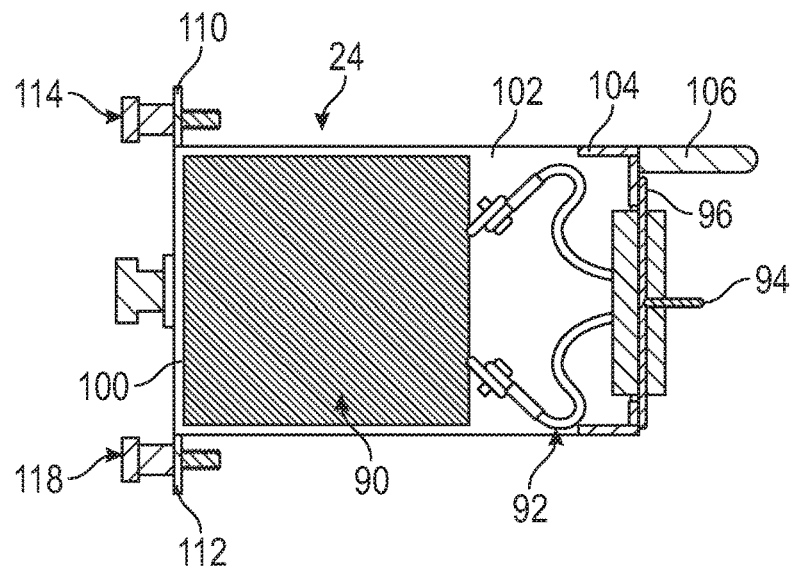
FIG. 3 is a view of a carrier of the large current circuit breaker installation.

Referring to the FIGS. 1 and 2, a portion of a large current circuit breaker installation 10 is shown. The large current circuit breaker installation 10 may utilize a modular or plug-in circuit breaker design to facilitate servicing and replacement of circuit breakers of the large current circuit breaker installation 10. The large current circuit breaker installation 10 includes a chassis 20, a panel interface assembly plate 22, and a carrier 24.

The chassis 20 may be installed into or supported by a structure of an aircraft, a vehicle, or other structure. The chassis 20 includes a body 30, a first panel 32, and a second panel 34. Each panel 32, 34 extends from the body 30. The first panel 32 may be arranged as a front face of the chassis 20 and defines a first opening 40. The carrier 24 is arranged to extend into and through the first opening 40 and is arranged to be connected to the first panel 32. The second panel 34 is spaced apart from the first panel 32 and defines an internal face or panel within the chassis 20. The second panel 34 defines a second opening 42.

Figure 6:
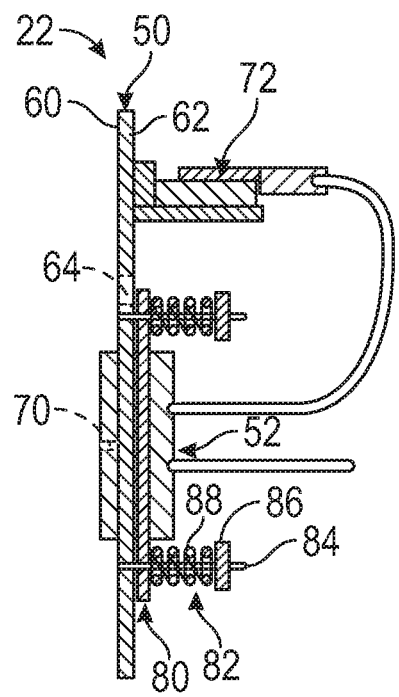
FIG. 6 is another view of the panel interface assembly plate of the large current circuit breaker installation.

Referring to FIGS. 1, 2, and 6, the panel interface assembly plate 22 includes a panel plate 50, a mating connector assembly 52, and a mounting assembly 54. The panel interface assembly plate 22 is disposed within the chassis 20 and is connected to the second panel 34.

Figure 5:
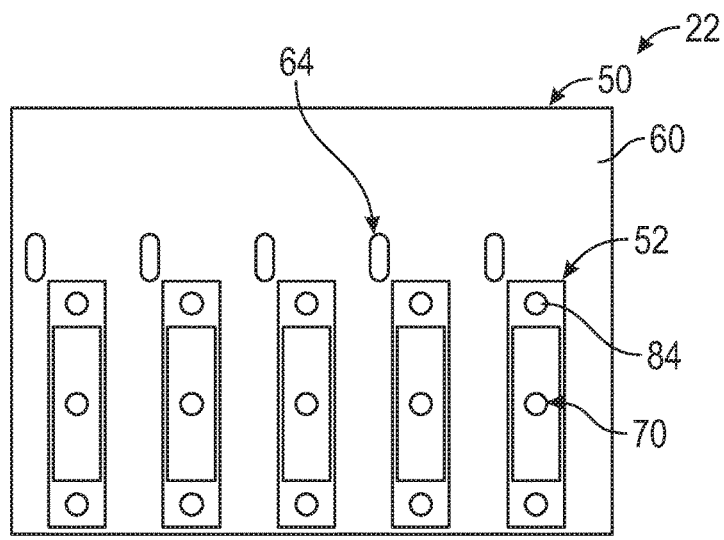
FIG. 5 is a view of a panel interface assembly plate of the large current circuit breaker installation.
Figure 8:
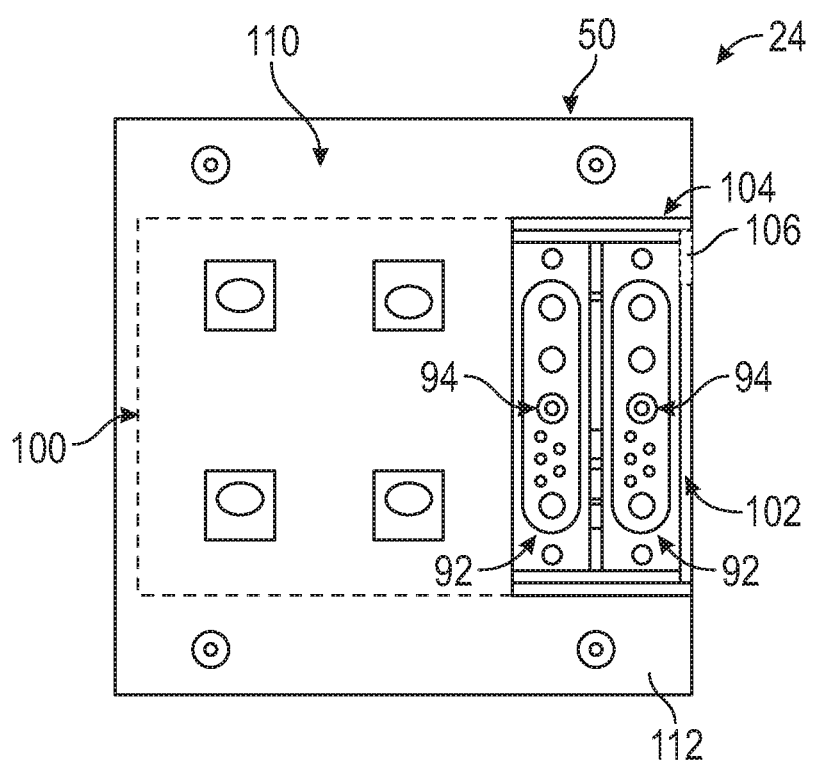
FIG. 8 is a back view of a carrier of the large current circuit breaker installation.

The panel plate 50 includes a first panel plate face 60 that engages or is connected to the second panel 34 and a second panel plate face 62 that is disposed opposite the first panel plate face 60. Referring to FIG. 5, the panel plate 50 defines a guide slot 64 that extends from the first panel plate face 60 to the second panel plate face 62. The guide slot 64 is disposed proximate the mating connector assembly 52. The guide slot 64 is arranged to receive a guide pin that extends from the carrier 24 to facilitate a connection between a circuit breaker connected to the carrier 24 and the mating connector assembly 52, should the large current circuit breaker installation 10 be adapted for usage with a DC circuit. Referring to FIG. 8, a back view of the carrier 24, the guide pin 106 may be defined proximate an edge of the second carrier plate 102, should the large current circuit breaker installation 10 be adapted for usage with a multiphase AC circuit.

Referring to FIGS. 1, 2, 5, and 6, the mating connector assembly 52 extends through the panel plate 50 such that the panel plate 50 is disposed about the mating connector assembly 52. The mating connector assembly 52 defines a connector guide pin socket 70 that is arranged to receive a connector guide pin or a precision guide pin 94 from the connector assembly 92 on the carrier 24. The mating connector assembly 52 is connected to a circuit breaker power source feed 72. The circuit breaker power source feed 72 is disposed on or connected to the second panel plate face 62 of the panel plate 50. The circuit breaker power source feed 72 is arranged to provide power, either DC or AC, to the mating connector assembly 52 and/or a connector assembly of the circuit breaker that is connected to the carrier 24.

The mounting assembly 54 enables the mating connector assembly 52 to be a spring loaded floating connector to accommodate or account for tolerances within the chassis 20. The mounting assembly 54 includes a connector flange plate 80 and a mounting spring assembly 82. The connector flange plate 80 is disposed about the mating connector assembly 52 and is located and connected to the panel plate 50 by a threaded guide stud of the mounting spring assembly 82. The connector flange plate 80 may be movable relative to the panel plate 50 by clearance holes in the connector flange plate 80 relative to the diameter of the threaded guide stud of the mounting spring assembly 82.

The mounting spring assembly 82 is disposed on the panel plate 50 through the mounting spring assembly 82 that includes the threaded guide stud 84, a retainer 86, and a biasing member 88. The threaded guide stud 84 extends through the connector flange plate 80 and is attached to the second panel plate face 62. The retainer 86 is disposed about an end of the threaded guide stud 84 and is spaced apart from the connector flange plate 80. The biasing member 88 is disposed about the threaded guide stud 84 and extends between the connector flange plate 80 and the retainer 86.

Figure 7:
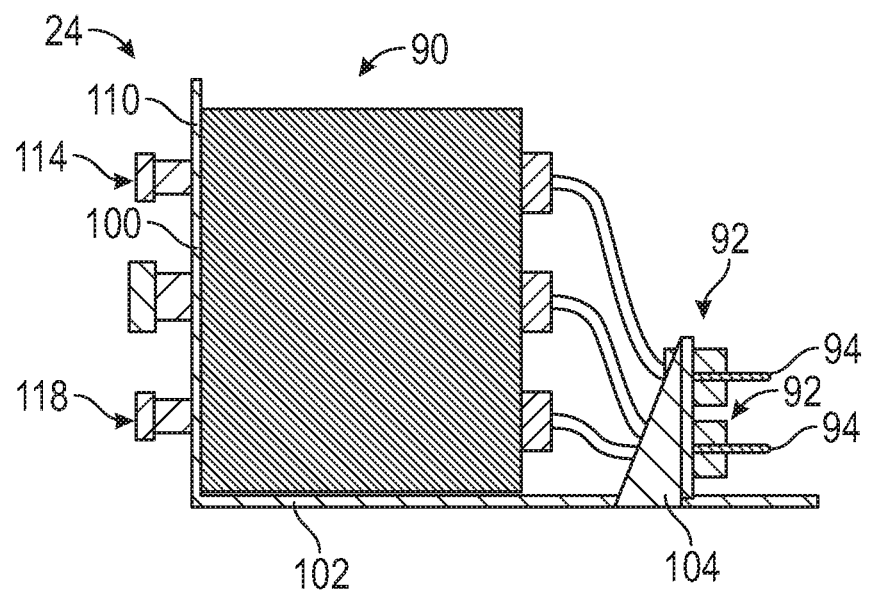
FIG. 7 is a top view of a carrier of the large multiple phase current circuit breaker installation.

The carrier 24 is arranged to receive a circuit breaker 90 and a connector assembly 92 that is connected to the circuit breaker 90. Referring to FIGS. 1-4, the connector assembly 92 includes a precision guide pin 94 that is arranged to extend into the connector guide pin socket 70 of the mating connector assembly 52 to connect the circuit breaker 90 to the panel interface assembly plate 22, should the large current circuit breaker installation 10 be adapted for usage with a DC circuit. Referring to FIG. 7, if multiple connector assemblies are required, precision guide pins 94 may be provided for each connector assembly 92 to extend into a respective connector guide pin socket 70 of the mating connector assembly 52 to connect the circuit breaker 90 to the panel interface assembly plate 22, should the large current circuit breaker installation 10 be adapted for usage with a multi-phase AC circuit.

The carrier 24 that receives the circuit breaker 90 and the connector assembly 92 is arranged as a carrier assembly that provides a plug-in circuit breaker assembly. The plug-in circuit breaker assembly allows each circuit breaker 90 to have its own mounting carrier enabling easier maintenance, servicing, installation, or removal of the circuit breaker assembly. Referring to FIGS. 1-4 and 7, the carrier 24 includes a first carrier plate 100, a second carrier plate 102, a bracket 104, and at least one guide pin 106. The first carrier plate 100 and the second carrier plate 102 may be provided as a single plate defining a bend or may be individual plates joined together.

The first carrier plate 100 is arranged to be connected to the circuit breaker 90. The first carrier plate 100 is connected to the first panel 32 by a first mounting foot 110 and a second mounting foot 112. The first mounting foot 110 extends from a first side of the first carrier plate 100 and abuts or engages the first panel 32. A first fastener assembly 114 is connected to the first mounting foot 110 and is arranged to connect the first mounting foot 110 to the first panel 32. The first fastener assembly 114 is arranged as a captive fastener assembly having a first fastener 116 that extends through the first mounting foot 110 and into the first panel 32. The second mounting foot 112 extends from a second side of the first carrier plate 100 that is disposed opposite the first side of the first carrier plate 100. The second mounting foot 112 abuts or engages the first panel 32. A second fastener assembly 118 is connected to the second mounting foot 112 and is arranged to connect the second mounting foot 112 to the first panel 32. The second fastener assembly 118 is arranged as a captive fastener assembly having a second fastener 120 that extends through the second mounting foot 112 and into the first panel 32.

Figure 4:
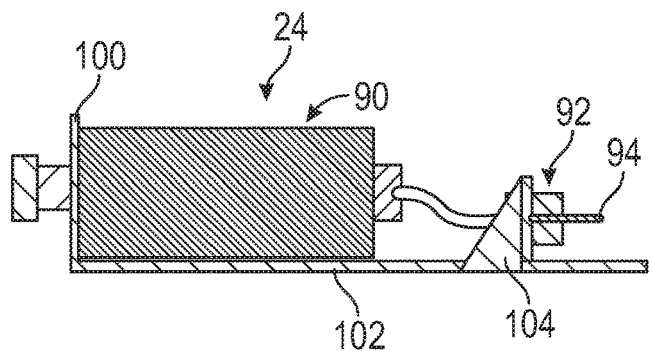
FIG. 4 is another view of the carrier of the large current circuit breaker installation.

The second carrier plate 102 extends from the first carrier plate 100. The second carrier plate 102 is disposed perpendicular to the first carrier plate 100. The second carrier plate 102 may be spaced apart from the circuit breaker 90, as shown in FIGS. 4 and 7.

The bracket 104 is connected to the second carrier plate 102 and is spaced apart from the first carrier plate 100. The bracket 104 may be disposed at an end of the second carrier plate 102. The bracket 104 is arranged to connect the connector assembly 92 to the carrier 24. The connector flange plate 96 of the connector assembly 92 is operatively connected to the bracket 104.

The guide pin 106 extends from at least one of the second carrier plate 102 and/or the bracket 104. The at least one guide pin 106 is arranged to be received within the guide slot 64, as shown in FIGS. 1, 2, and 5. The guide pin 106 may also provide a keying feature for different rated circuit breakers by indexing or rotating the guide pin 106 to different angles to be received in the same indexed or rotated guide slot 64. The receiving of a guide pin 106 within a guide slot 64 generally aligns the precision guide pin 94 of the connector assembly 92 with the connector guide pin socket 70 of the mating connector assembly 52 to facilitate the blind connection between the circuit breaker assembly and the panel interface assembly plate 22.

This modular circuit breaker arrangement enables the carrier 24 carrying the circuit breaker 90 to be easily removed from or inserted into the first opening 40 of the chassis 20, as shown in FIG. 1. The guide pin 106 extends through the second opening 42 and is received in a guide slot 64 that is defined in the panel plate 50 of the panel interface assembly plate 22 that is connected to the second panel 34 of the chassis 20, as shown in FIG. 2. Responsive to the guide pin 106 being received within the guide slot 64, the precision guide pin 94 of the connector assembly 92 that is connected to the circuit breaker 90 that is carried by the carrier 24 is aligned with the connector guide pin socket 70 of the mating connector assembly 52. The fastener assemblies 114, 118 are aligned with holes or openings within the first panel 32 and the fasteners 116, 120 to connect the mounting feet 110, 112 of the carrier 24 to the chassis 20 and the connection between the circuit breaker 90 and the panel interface assembly plate 22 is secured.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A circuit breaker installation, comprising:
   a chassis having a first panel defining a first opening and a second panel spaced apart from the first panel, the second panel defining a second opening;
   a panel interface assembly plate connected to the second panel, the panel interface assembly plate having:
      a panel plate defining a guide slot, and
      a mating connector assembly extending through the panel plate; and
   a carrier arranged to receive a circuit breaker and a connector assembly connected to the circuit breaker, comprising:
      a first carrier plate arranged to be connected to the circuit breaker,
      a second carrier plate extending from the first carrier plate,
      a bracket connected the second carrier plate and spaced apart from the first carrier plate, the bracket arranged to be connected to the connector assembly, and
      a guide pin extending from at least one of the second carrier plate and the bracket, the guide pin being arranged to be received within the guide slot.

2. The circuit breaker installation of claim 1, wherein the connector assembly includes a connector guide pin.

3. The circuit breaker installation of claim 2, wherein receiving of the guide pin within the guide slot facilitates aligning the connector guide pin with a connector guide pin socket of the mating connector assembly.

4. The circuit breaker installation of claim 1, wherein the panel interface assembly plate further comprising:
   a mounting assembly having:
      a connector flange plate disposed about the mating connector assembly, and
      a mounting spring assembly disposed on the connector flange plate.

5. The circuit breaker installation of claim 4, wherein the mounting spring assembly including:
   a threaded guide stud extending through the connector flange plate and into the second panel, and
   a biasing member disposed about the threaded guide stud and extending between the connector flange plate and retainer disposed about the threaded guide stud.

6. The circuit breaker installation of claim 5, further comprising:
   a circuit breaker power source feed disposed on the second panel and is connected to the mating connector assembly.

7. The circuit breaker installation of claim 1, wherein the first carrier plate includes:
   a first mounting foot arranged to abut the first panel; and
   a second mounting foot disposed opposite the first mounting foot, the second mounting foot being arranged to abut the first panel.

8. The circuit breaker installation of claim 7, further comprising:
   a first fastener assembly connected to the first mounting foot, the first fastener assembly having a first fastener that is arranged to extend through the first mounting foot and into the first panel to connect the first mounting foot to the first panel.

9. The circuit breaker installation of claim 8, further comprising:
   a second fastener assembly connected to the second mounting foot, the second fastener assembly having a second fastener that is arranged to extend through the second mounting foot and into the first panel to connect the second mounting foot to the first panel.

10. A carrier and panel interface assembly plate for a circuit breaker installation, comprising:
    a carrier, comprising:
       a first carrier plate connected to a circuit breaker,
       a second carrier plate extending from the first carrier plate,
       a bracket connected to the second carrier plate and spaced apart from the first carrier plate, the bracket connected to a connector assembly that is connected to the circuit breaker, and
       a guide pin extending from at least one of the second carrier plate and the bracket.

11. The carrier and panel interface assembly plate of claim 10, wherein the second carrier plate is disposed perpendicular to the first carrier plate.

12. The carrier and panel interface assembly plate of claim 10, wherein the connector assembly includes a connector pin that is spaced apart from and is disposed parallel to the guide pin.

13. The carrier and panel interface assembly plate of claim 12, further comprising:
    a panel interface assembly plate, comprising:
       a panel plate defining a guide slot that extends from a first panel plate face to a second panel plate face, the guide slot arranged to receive the guide pin; and
       a mating connector assembly extending through the panel plate, the mating connector assembly having a connector guide pin socket that is arranged to receive the connector pin.

14. The carrier and panel interface assembly plate of claim 13, wherein receiving of the guide pin within the guide slot generally aligns the connector pin with the connector guide pin socket.

15. The carrier and panel interface assembly plate of claim 13, the panel interface assembly plate further comprising:
    a mounting assembly, comprising:
       a connector flange plate disposed about the mating connector assembly and disposed proximate the second panel plate face, and
       a mounting spring assembly having:
          a threaded guide stud that extends through the connector flange plate and into the second panel plate face, and a biasing member disposed about the threaded guide stud and extending between the connector flange plate and a retainer disposed about the threaded guide stud.

16. A method of assembling a circuit breaker installation, comprising:
  inserting a carrier carrying a circuit breaker connected to a connector assembly having a connector pin, into a first opening of a chassis; and
  receiving a guide pin that extends from the carrier in a guide slot that is defined in a panel of a panel interface assembly plate that is disposed within a second opening of the chassis.

17. The method of claim 16, wherein the panel interface assembly plate includes a mating connector assembly having a connector guide pin socket.

18. The method of claim 17, further comprising:
  aligning the connector pin of the connector assembly with the connector guide pin socket of the mating connector assembly responsive to the receiving of the guide pin within the guide slot.

* * * * *